United States Patent [19]

Montague

[11] 4,448,437
[45] May 15, 1984

[54] FOLDABLE BICYCLE

[76] Inventor: Harry D. Montague, 3042 Newark St., Washington, D.C.

[21] Appl. No.: 298,145

[22] Filed: Aug. 31, 1981

[51] Int. Cl.³ .................................................. B62K 15/00
[52] U.S. Cl. ........................................ 280/287; 280/278
[58] Field of Search .................................. 280/278, 287

[56] References Cited

U.S. PATENT DOCUMENTS

| | | | |
|---|---|---|---|
| 378,253 | 2/1888 | Latta | 280/278 |
| 413,415 | 10/1889 | O'Brien | 280/287 |
| 607,325 | 7/1898 | Barnes | 280/287 |
| 640,680 | 1/1900 | Merrow | 280/287 |
| 2,602,677 | 7/1952 | Connolly | 280/278 |
| 3,374,009 | 3/1968 | Jeunet | 280/287 |
| 3,710,883 | 1/1973 | Rizzo | 280/287 |
| 4,002,351 | 1/1977 | Zuck | 280/278 |
| 4,022,485 | 3/1977 | Cox | 280/287 |
| 4,067,589 | 1/1978 | Hon | 280/287 |
| 4,165,093 | 8/1979 | Biskup | 280/278 |

FOREIGN PATENT DOCUMENTS

| | | | |
|---|---|---|---|
| 84291 | 11/1964 | France | 280/278 |
| 26352 | of 1899 | United Kingdom | 280/278 |

*Primary Examiner*—Joseph F. Peters, Jr.
*Assistant Examiner*—Kenneth R. Rice
*Attorney, Agent, or Firm*—Sughrue, Mion, Zinn, Macpeak, and Seas

[57] ABSTRACT

A foldable bicycle has separate front and rear frames coupled to each other at a seat post formed by concentric frame members. A locking mechanism positions the frame members in either a rigid open or folded position. The pedal housing is located on the rear frame member either as an extension of the seat tube or positioned between the seat tube and the chain stays. The bicycle uses standard components to form the drive, brake and steering assemblies. In the folded state, the bicycle may be backpacked using available straps and webs that are attached to the front frame.

18 Claims, 6 Drawing Figures

FOLDABLE BICYCLE

BACKGROUND OF THE INVENTION

1. Field of the Invention

This invention relates to a collapsible bicycle. In particular, this invention relates to a bicycle having separate rigid main and rear frame members joined together by concentric members forming the seat tube and foldable thereabout.

2. Prior Art

Foldable bicycle technology is replete with a number of constructions attempting to accomplish folding operations yet provide satisfactory bicycle performance. Many of these prior art constructions are technically deficient, requiring difficult, time-consuming operations to collapse or assemble the bicycle or, not providing for adequate riding dynamics when operated. Additionally, given stringent safety requirements, the vast number of prior art proposals are unacceptable in the first as not satisfying contemporary safety rules. For example, many frames which are not permanent structurally integral members are deemed to have inadequate strength characteristics necessary for contemporary bicycle design. Frame systems shown in U.S. Pat. No. 607,325 and U.S. Pat. No. 640,680 are characteristic of a number of prior art frame members which are hinged, telescoping, and the like. While a reduction in size of the bicycle frame is effectuated by those techniques, it requires changes in the strength capacity of the individual frame elements and would not guarantee the fail safe design that is necessary for present day Government approval. In U.S. Pat. No. 607,325, the top tube is sleeved and joined by a collar a. The down tube D is hinged into two portions. Such constructions, while offering foldability, should the hinging or sleeving mechanism come loose the bike does not afford adequate frame rigidity and strength and would be dangerous.

A contemporary example of a foldable bicycle configuration having a rigid front frame is found in U.S. Pat. No. 4,022,485. In this prior art system, the collapsible bicycle includes a rigid main frame while having a collapsible rear frame which is hinged and foldable about a pin located at the pedal housing. However, the rear frame is not a rigid member but rather, a series of segments having pivoting portions to allow the rear frame elements to collapse into a storage position over the rigid main frame. Again, should the pin come loose, the bike would collapse.

Another prior art attempt at achieving a folding bicycle having relatively rigid main and rear frame members is found in U.S. Pat. No. 3,374,009. In this system, the rear frame elements comprising the seat tube 2, the chain stays 5, and the seat stays 7 form a rigid integral assembly. However, the down tube comprises two sections 14 and 15 hinged at a point of articulation 16. Hence, while the necessary structural strength required to support the seat is effectuated by a rigid rear frame member, inherent weakness in the front frame is apparent.

The prior art is however replete with a number of systems having rigid front and rear frames which are foldable to achieve a portable bicycle configuration. Typical of these devices are U.S. Pat. Nos. 3,710,883 and 4,067,589. While portability is achieved, these systems suffer from other defects. First, the number of frame elements is complicated, the locking mechanisms difficult to work, and, most importantly, the bicycles when assembled do not offer satisfactory performance. The hallmark characteristics of all satisfactory foldable bicycle configurations currently in existence is the use of small wheels coupled with high frame weight. The use of such wheels increases the rolling friction, alters the center of gravity of the bicycle, and therefore, does not afford to the user those riding characteristics of a large bike which are required. This inadequacy is made more conspicuous by the frame weight that hinders riding dynamics. As noted in "Better Bikes", Cuthbertson, Ten Speed Press (1980) these folding bikes have poor riding characteristics. The advent of lightweight 10-speed bicycles utilizing full size, typically 27 inch wheels provides a model for an acceptable folding bicycle configuration that should attempt to use those same standard components yet at the same time reduce weight.

The use of standard components, such as full size wheels, brake assemblies, gear chain mechanisms and the like, reduces costs and increases serviceability of the bicycle by relying solely on commercially available components. Secondly, a standing requirement exists in this field for the reduction of weight of the bicycle frame itself. In addition to reducing the overall size of the bicycle, portability implies the ability to easily transport the bicycle in a folded condition. Hence, even if folded, the bicycle should form a "package" that can be conveniently handled. In an extreme example, backpacking, a folded bicycle should be within a weight range to allow transportation on the back of a person. Such a bicycle is not known in the technology. In a more conventional example, portability during travel on airlines or the like, the bicycle should be not only compact in size but easily handled in terms not having projecting parts, and shielding the gear mechanism. Ideally, one wheel of the folded bicycle, such as the rear wheel should provide rolling support so that the "package" can be moved without lifting. Accordingly, there still exists in this technology a need for a foldable bicycle, one using standard components, one satisfying existing safety requirements needed for commercial manufacturing, yet achieving the necessary performance characteristics attained in conventional lightweight 10-speed bicycles.

SUMMARY OF THE INVENTION

Given the deficiencies in the prior art, it is an object of this invention to define a foldable bicycle that is lightweight, has the necessary strength characteristics, and provides riding performance commensurate with contemporary fixed frame bicycle designs.

Yet another object of this invention is to define a folding bicycle which may be reduced in size to allow for easy transportation by carrying or using a single wheel for support.

Still another object of this invention is to define a folding bicycle which in its folding configuration allows backpacking yet not interfering with the walking motion of the user.

A further object of this invention is to define a folding bicycle design meeting contemporary safety requirements.

A still further object of this invention is to provide a bicycle that may be marketed economically and serviced utilizing standard components.

These and other objects of this invention are achieved in a folding bicycle design utilizing rigid frame elements that fold around the seat tube formed from concentric elements and not at some outside structurally unrelated point to the bicycle design. As elaborated herein, conventional folding bicycles require additional stress points which must be overcome by having additional framing elements to provide the necessary structural integrity. In accordance with the present invention, both the stress of the beam action and the stress of any hinges are resolved within the seat tube itself and accordingly offset mechanisms are not required. The bicycle frame in accordance with the present invention is made up of two interlocking frames, one formed by the top, down, head and seat tubes and the other formed by the seat and chain stays and the seat tube. Each of the frame elements is complete and/or acts as a complete element being structurally integral. The seat tube is made up of two full length concentric posts or to save weight one full length post and one partial length post collared to the full length post. The collared construction does not weaken the bicycles resistance to vertical loads. The one complete and one partial frame forms as strong a total frame as if two separate and complete frames were used. A third post of seat post slides into the other two.

This hallmark characteristic of the present invention defines two distinct embodiments. In the first embodiment, the front frame is smaller than the back at a point where it joins the seat tube and forms the outside concentric ring of the seat tube. In these embodiments, the down tube of the bicycle is joined to the outer ring a few inches above the pedal housing and the top tube is dropped several inches until it is placed well below the joint of the seat stays and the seat posts but still is above the brake pivot stay when folded. In the two possible embodiments shown, each has two species; the first with two complete frames and the second with the larger of the frames being complete and the other frame collared to it. The second specie is a lighter but functionally and structurally equal construction.

In a second embodiment, the front frame is larger than the back frame at a point where it joins the seat tube and forms the inner concentric ring of the seat tube. Because in traditional bike design, the front half of the frame is always larger than the rear half, this embodiment is the preferred mode of construction of the folding parts. As a result, the front half can be folded geometrically around the back half. In this embodiment, the bottom bracket or pedal housing may be almost in the traditional position at the intersection of the chain stays, seat and down tubes but slightly to either side. It is offset just enough to permit a solid front frame seat tube to bypass the solid pedal bracket shaft. A bar attached to the seat tube extends below the center of the pedal housing and provides a folding pivot point and at the same time affords protection for the chain wheel during the folding process. Again, both the complete frame and the collared frame embodiments are shown.

In accordance with the present invention, standard derailleur mechanisms and control levers are utilized. A modification in the position of the control lever is accomplished to enhance foldability by relocating the control lever to the top tube and having the cable run back along the top tube to the seat post and then down the seat stay on the derailleur side. Since normally two control levers are utilized, one cable will cross over at the seat post and will be retained by a guide at that point to insure that the cable remains in place when the bicycle is folded.

Moreover, in accordance with the present invention, the folding process is achieved expeditiously without the requirement of having to utilize a large number of tools or to materially disassemble the bicycle. Rather, such traditional steps of removal of the front wheel, moving the seat post and handlebar, if necessary, stem downward are accomplished with the release of only a bolt lever necessary to fold the frames. In a folded position, the approximate size of the bicycle is determined by the wheel size in the height direction and by the wheel size plus the wheel chain projection in the length direction. In such a folded position, the bicycle can easily fit into the trunk space in small size cars, conforms to airplane travel requirements, may be carried aboard elevators, and generally carried in one hand as is a suitcase. The bicycle may also be rolled along on one wheel as a suitcase on wheels.

A second important advantage of the bicycle in its folded position is that it can be carried in a traditional backpack manner. In this mode, the front frame acts as a frame in a backpack, with the length being scaled identically to that of an adult. The frame in the folded position is configured to be symmetrically balanced around the center of the backpack person. Standard accessories to achieve backpack portability of the folded bicycle in accordance with the present invention are used, such as padded shoulder straps, a back band, hip belt and eyelets to attach peripheral equipment.

This invention will be described in greater detail by referring to the attached drawings and the description of the preferred embodiment which follows.

DESCRIPTION OF THE PREFERRED EMBODIMENT

Figure 1:
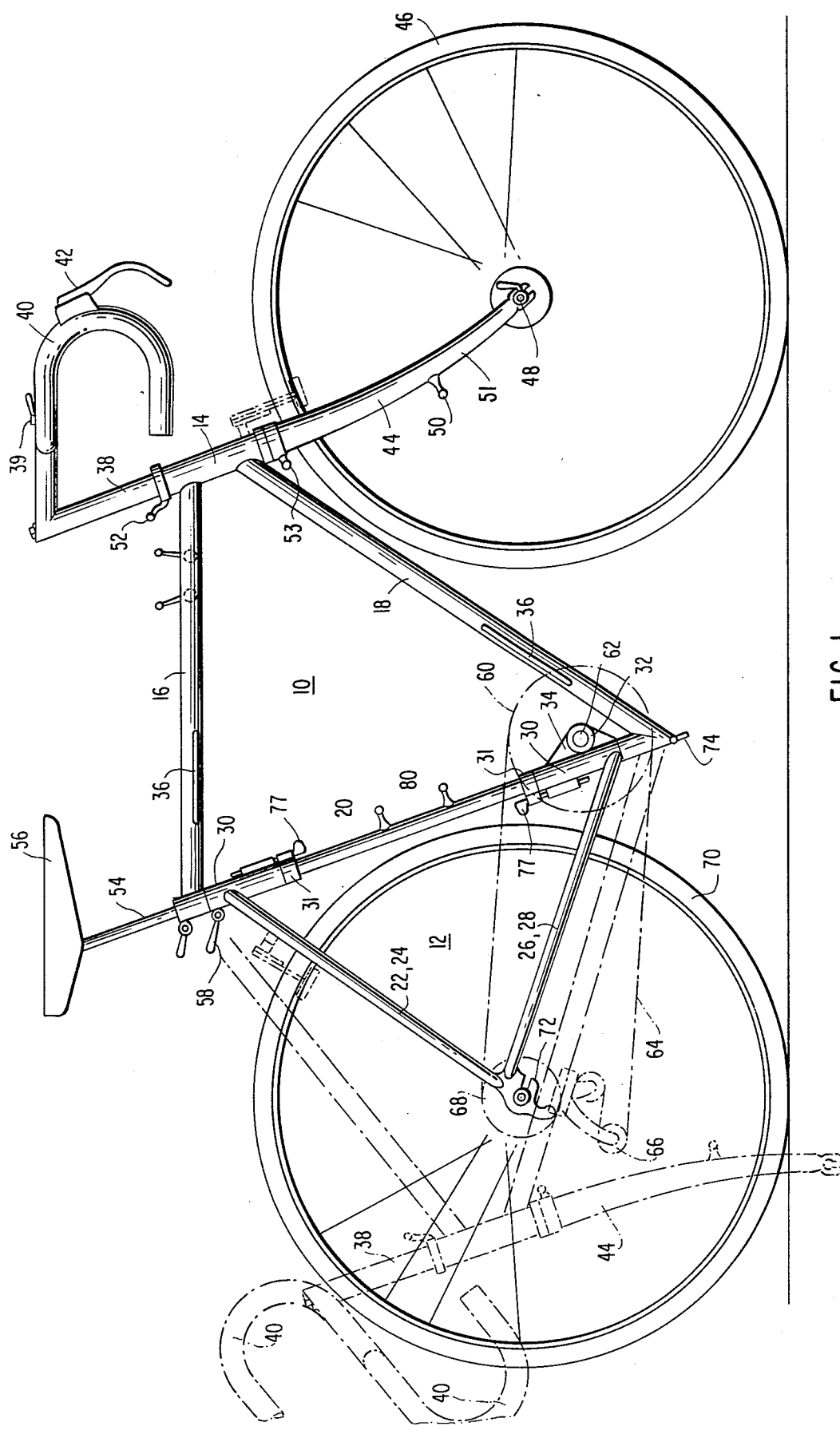
FIG. 1 is a side elevation view of the folding bicycle in accordance with the present invention.

Referring now to FIGS. 1 and 2, the preferred embodiment of this invention is shown. FIGS. 2A, 2B, 2C and 2D show the fundamental alternative rigid frame configurations used in accordance with the present invention. In FIGS. 2A and 2B, the front frame member 10 is smaller than the rear frame member 12. In FIGS. 2C and 2D, the front frame member 10 is made larger than the rear frame member 12. An important characteristic of both embodiments is the concentric nature of the seat tubes used to interlock the two frame members. In FIGS. 2A, 2B, 2C and 2D, the front frame member 10 comprises a head tube 14, a top tube 16, a down tube 18, and a seat tube component 20. These elements are constructed utilizing conventional bicycle technology by welding tubular elements to form a rigid construction. In FIGS. 2B and 2D components 20 and 30 are collared into complete continuous components. The collar elements 31 are stops for the partial frame elements locking their vertical position on the continuous frame.

The rear assembly 12 comprises a pair of seat stays 22, 24 and chain stays 26 and 28. The two sets of seat and chain stays are welded to the tube seat 30. In the first embodiment, the pedal housing 32 is dropped below the seat tube in a conventional manner. In accordance with this invention, the seat tube 30 is placed concentrically inside the seat tube 20 so that rotation between the front and rear frame members can take place during the folding operation. The seat and chain stays are then welded into place to complete the assembly. The concentric seat tubes are held in rigid position utilizing quick release binder bolts and alignment pins or the like positioned on the upper and lower portions of the seat tube. It is understood that a third concentric tube, namely, the seat post will be mounted inside the two seat tubes.

Figure 2D:
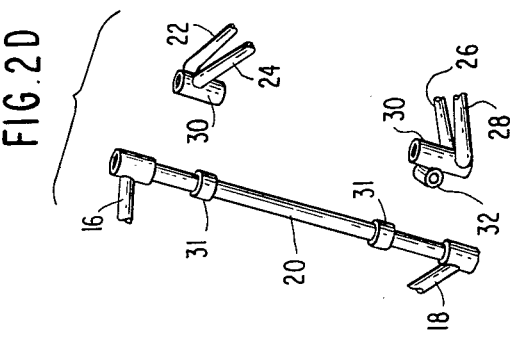
FIGS. 2C and 2D are schematic side views showing a second embodiment of the frames in accordance with this invention where the front frame is solid and the larger of the frames.
Figure 2B:
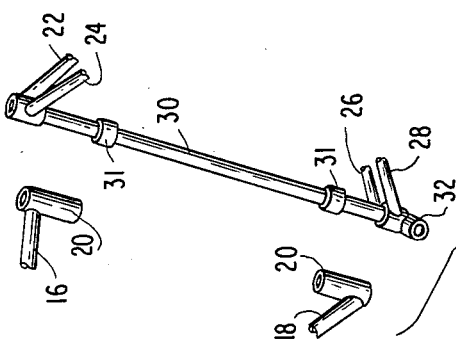
FIGS. 2A and 2B are schematic side views showing a first embodiment of the frames utilized in accordance with the present invention where the rear frame is solid and the larger of the frames.
Figure 2C:
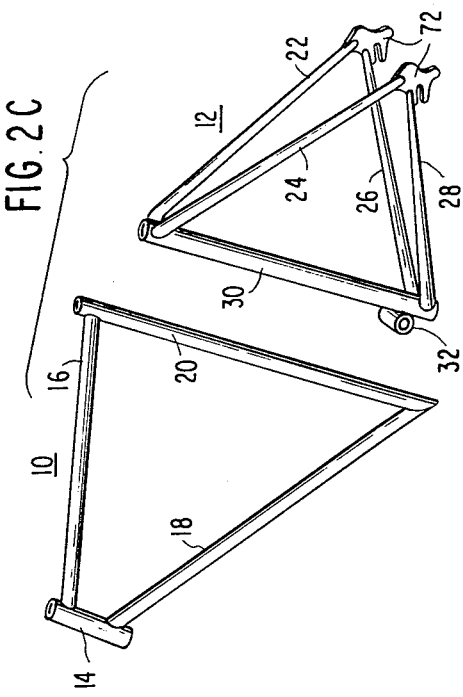
Figure 2A:
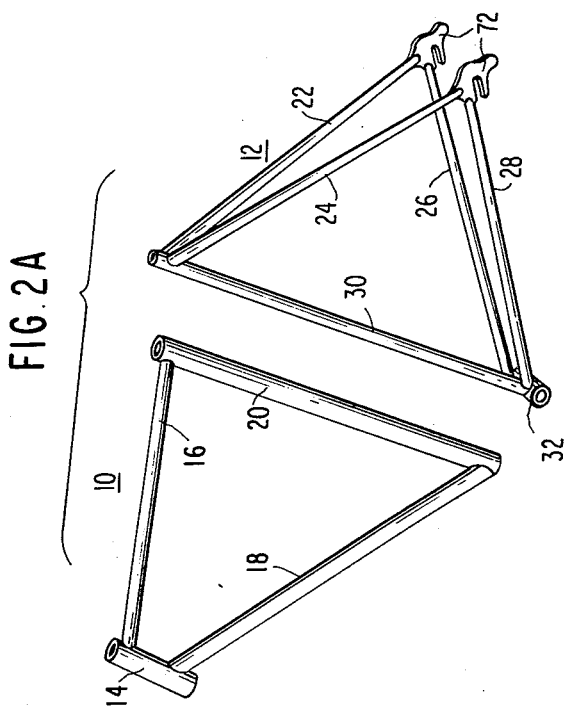

The second embodiment of this invention, shown in FIGS. 2C and 2D, utilize the same fundamental elements for the front frame 10. The fundamental distinction between the embodiment of FIGS. 2C and 2D, vis-a-vis that of FIGS. 2A and 2B, is that the seat post member 20 in the embodiment of FIGS. 2C and 2D is made longer so that the front frame 10 is larger than the rear frame 12. The rear frame is modified from that shown in FIGS. 2A, 2B in two respects. First, the pedal housing 32 is moved from the position downwardly extending from the seat tube to a point on either side of the seat tube so that the pedal shaft bypasses the seat tube. To provide the necessary rigidity for the pedal housing an additional bracket member 34 is used to hold the pedal housing to join the seat post. The pedal housing and this bracket member 34 are welded to the seat tube to provide an integral rigid assembly. The figures show the pedal housing forward of the seat tube, but it is understood that it may be placed behind the seat tube with a similar bracket 34.

In the embodiment of FIG. 2B, the seat post 20 fits concentrically inside the seat post 30 to allow pivotal action of the front frame 10 relative to the rear frame 12. In an opened, operable position, the two seat tubes are held rigidly together by quick release binder bolts and alignment pins or the like. The bicycle is configured to fold in only one direction from the straight position, metal blocks, not shown, being set on the alignment pins.

FIG. 1 shows the complete bicycle assembly which, apart from the two frame members, utilizes completely standard components. The embodiment of FIG. 1 is constructed in a manner consistent with the frame assembly shown in FIG. 2C. That is, the same front frame member 10 is shown comprising a head tube 14, a top tube 16, a down tube 18, and a seat tube 20.

As is standard in conventional bicycle frames, the head tube 14 houses a concentric internal handle bar stem 38. The stem 38 is locked in position by binder bolt 39. The bolt 39, when released allows the handle bars to be rotated for storage or adjustment. Conventional lightweight bicycles utilize handle bar members 40 having attached brake handles 42. It is understood, that although not shown in FIG. 1, the brake handles 42 will have associated therewith operative cabling and brake members disposed relative to the front and rear wheel frames.

The handle bar stem 38 fits concentrically in the head tube 14 having a pair of forks 44 to mount a conventional full size front wheel 46. Attachment of the front wheel 46 to the forks 44 is by any conventional quick release mechanism associated with the wheel axle 48. Accordingly, the steering mechanism of the bicycle in accordance with the present invention comprising the head tube 14, the concentric handle bar stem 38, handle bars 40, forks 44, front wheel 46, and front wheel axle 48 are all standard items in lightweight full size bicycle design. In that sense, it is recognized that the handle bar stem 38 is movable within the head tube 14 so that handle bar adjustment upward or downward may be effectuated. This would be necessary only in a small size 20-inch wheel model. FIG. 1 also shows three sets of optional accessory components to the front frame section which are utilizable in a backpack configuration. Specifically, attachment points 80 and 36, are shown, it being recognized that they would not be used on a foldable bicycle in accordance with this invention that was not designed for backpack usage. These members will be discussed in conjunction with the folding of the bicycle in accordance with FIG. 3.

The rear frame member 12 comprises a pair of seat stays 22, 24 and a pair of chain stays 26, 28 with the seat tube 30 disposed concentrically outside the inner seat tube 20 of the front frame member. A seat post 54 forms a third element of the bicycle seat post assembly with the seat 56 attached thereto in a conventional manner. A quick release binder bolt 58 and the alignment pins 77 lock and align the seat post members together in a rigid configuration when the bicycle is open.

The pedal housing 32 is cut around and attached to the seat tube 30 connected to the chain stays 26, 28 with frame members 34 positioned to lock the housing in place. As shown in FIG. 1, continuous weld points exist between the circular cut pedal housing 32 and the seat tube 30, the chain stays 26, 28 and the frame members 34. In the embodiment of FIG. 1, the pedal housing is positioned only ¾" off the center of the seat tube, so as in non-folding bicycles the normal orientation of the pedals relative to the seat 56 is maintained for the traditional power geometry of the bicycle.

The drive train mechanism of the bicycle in accordance with this invention utilizes standard components found in full sized ten-speed bicycles. That is, a large drive sprocket assembly 60 typically concentric sprocket gears of different diameter is mounted on a pedal shaft 62 with pedals, not shown, extending outwardly therefrom. A drive chain 64 is threaded through a derailleur mechanism 66 and drives a gear cluster 68 in a usual manner. Accordingly, in all respects, the drive mechanism of the embodiment shown in FIG. 1 corresponds to conventionally used components in standard bicycle assemblies. It is also noted that during the folding of the bicycle, none of the gear mechanisms are in any way affected by that operation. The mechanisms are also shielded when the bicycle is folded, protecting them and minimizing the transfer of lubricants.

In accordance with a preferred embodiment of this invention, the gear handle to operate the derailleur 66 are moved from the down tube 18 to the top tube 16. Typically, two such gear levers are used for a 10-speed bicycle with each lever straddling the top tube 16. The control cables run rearward along the top tube 16 then down the seat stays on the derailleur side 22 until they reach the derailleur mechanism. One of the control cables will cross over at this point to be on the same side of the bicycle as the derailleur mechanism 66. In the embodiment of FIG. 2D, tube 30 extends up high enough to hold the front derailleur.

In a conventional manner, a rear wheel 70 is attached to the dropouts 72 associated with the inner section of the seat stays and the chain stays. The mounting of the rear wheel 70 is done in a manner conventional in such lightweight bicycle construction. Accordingly, with the exception of the novel configurations of the front and rear frame members 10 and 12 and the positioning of the pedal housing, the bicycle in accordance with the invention utilizes standard components.

Referring now to the phantom line portion of FIG. 1, the folding operation in accordance with the present invention will be discussed. The first step is the removal of the front wheel utilizing the quick release mechanism associated with the dropouts at the front wheel hub 48. The bicycle is then set down to rest on the down tube 18 pivot folding point 74 with the back wheel 70, the front fork arms 44 positioned slightly above the ground. Secondly, the seat tube folding alignment pins, the first of two folding safety devices are moved. The alignment pins 77 are shown schematically in FIG. 1 as sliding bolts attached to the seat tube 30. They slide down and up respectively holding the down and top tubes to the seat tube 30. Thirdly, the seat tube folding binder bolt 58 is removed by releasing an appropriate lever. The binder bolt is the second safety device insuring that the bicycle frames will not move relative to each other when the bicycle is in an open position. Release of the seat post binder bolt allows the seat stem 54 to be pushed down into the top tube. The frame is then folded.

A front wheel carrying bracket (not shown) associated with the rear wheel hub is then pulled out and the front wheel, previously removed, is secured using the front wheel quick release levers, not shown. The handle bars are then turned toward the folded position of the bike until they are perpendicular to the axis of the bike in the riding position so that a head-set locking pin will drop into place. It is recognized, then, that the total lateral area of the folded bicycle is determined approximately by the wheel size in the height direction and by the wheel size plus the large sprocket 60 projection in the length direction. Hence, for a standard 27-inch wheel, the dimensions of the folded bicycle are approximately 27 inches high by 32 inches long.

The embodiment of FIG. 1 is also applicable to so called "mini bikes". For a 20-inch wheel, the folded size would be approximately 20 inches high by 28 inches long or, generally, the size of a large suitcase. The only changes necessary to convert this embodiment to "mini bike" size, would be first the curving of the down tube to provide a 14" wide front frame near the seat tube. In order for the back packing it is curved around the front wheel to join the head set only 7" wide at that point. The use of a longer telescoping seat post to compensate for the lower elongated frame and a change of the front brake pivot bolt to two longer side bolts so that a longer handle bar stem post can be pushed down between the front forks 44 when the bicycle is in the folded position. In this configuration, the bicycle will fit into a trunk and since it is a smaller size, is compatible for carrying perfect for backpacking on airplanes, metros, elevators or the like. It can therefore be transported with no more difficulty than an ordinary suitcase. If desired, all the accessories for backpacking can be added and a handle for carrying purposes can be attached to the top tube 16.

Figure 3:
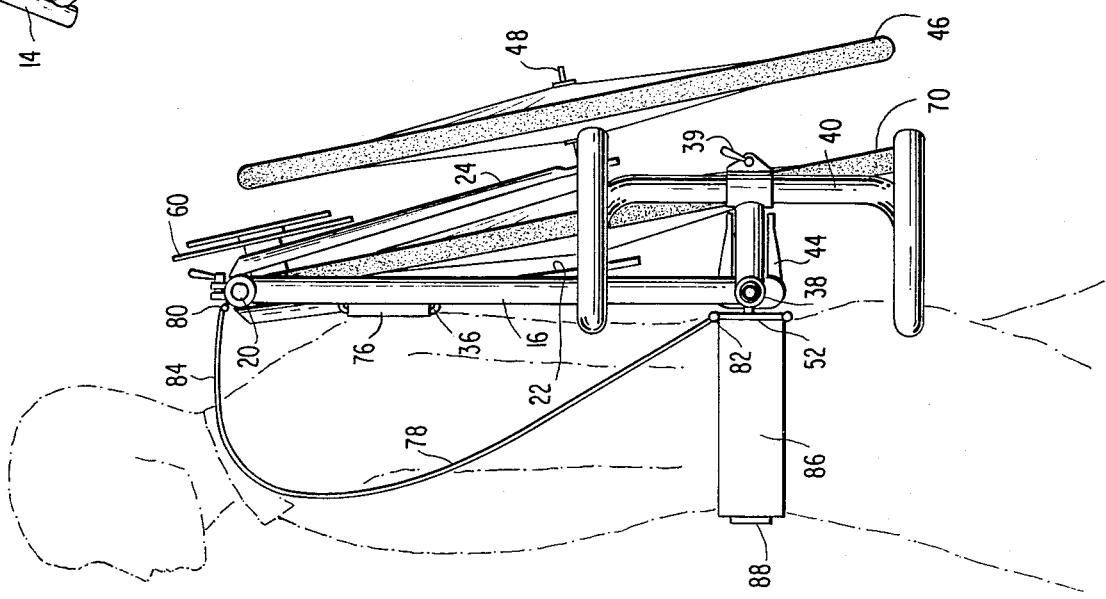
FIG. 3 is a side elevation view of a folded bicycle used in a backpack mode of transportation.

An important aspect of the folded condition of this bicycle is its utilization in a backpack mode. This is shown in FIG. 3. The bicycle in accordance with the present invention is engineered to be scaled to an adult in the folded position to allow it to be carried on the person's back. The frame also has additional elements needed to mount camping gear and bags. As shown in FIG. 3, the length of the top frame 16 corresponds to the approximate distance from shoulder height to the waist of an adult person. The rear frame members are disposed outward and are symmetrically balanced about the center of the packer. The mounting of the front wheel 46 is also symmetrically positioned relative to the backpack position. Importantly, the handle bars 40 adjusted by release of bolt 39 extend backward away from the hip. In order to modify the bicycle for use in a backpack mode, the three basic body attachment accessories of a backpack must be incorporated onto the bike frame. First, at the top is the shoulder straps 78 securing the backpack load to the shoulders attached just behind the neck and on each side of the waist. Second is the backband 76 which holds the metal frame off the back and is attached to each side of the frame. Thirdly is the hip belt 86 which carries the weight of the load transferring it to the hip, and is attached to the lower bar of the frame at the waist level.

Shoulder straps 78 extend from the seat tube 30 positioned in a symmetrical relationship spaced from the ends thereof and attached by eyelets 80 on the strip and are coupled, one to the handle bar stem 38 by means of an eyelet 82 and a second shoulder strap, not shown, coupled to the back of fork arm 44. Hence, symmetrical shoulder straps are provided to allow the folded bicycle to be carried by the backpacker.

The shoulder straps have a padded area 84 that would be approximately 12 inches long and coupled with extending straps and buckles to the seat tube when the bike is being driven. They would then be wrapped around in any conventional manner. It is understood that while eye hooks or the like may be used to attach the straps to the bicycle frame, any conventional mode of attachment may be used.

The backband strip 76 is positioned on the bicycle between the accessory attachment members 36 on the top and down tube which act as the sides of the backpack frame. Hence, when the bicycle is positioned on the back, member 76 allows a stand off distance to be maintained between the carriers' shoulder blades and the bike frame.

A hip belt 86 is positioned in a looping manner between the tapered portion of curved forks 51 and attached therewith by eyelets 50, 52. The belt is approximately 4 inches wide and to an additional point in the center on the back of the brake pivot bolt 53. The curved forks 51 extending in conjunction with the hip belt are wrapped around the waist of the user and transfer the backpack weight closer to the center of the user. A conventional buckle 88 or the like is used to cinch the hip belt in place.

It is apparent then that the bicycle in a folded position acting as a backpack can have additional pannier packs 92 or other conventional backpacking equipment attached to the shoulder strap eyelet 80. Hence, portability of the bicycle in the folded position over unimproved terrain is assured while at the same time fulfilling a dual purpose for backpacking purposes.

Accordingly, in accordance with the present invention, a full size lightweight bicycle is defined that meets existing safety criteria. The bicycle comprises in its basic form rigid frames which are interconnected in a concentric manner. The bicycle components comprising the drive system, brakes, wheel, handle bars, seat assembly and the like are all conventional components. The bicycle, however, in the folded condition offers unique portability and backpacking capabilty. Being capable of utilizing full size 27-inch wheels, performance comparable to existing lightweight bicycles is assured. Moreover, because the requirement for additional frame members is minimized, overall weight of the bicycle remains commensurate with that of traditional rigid designs.

While the preferred embodiment of FIG. 1 is shown having the front frame 10 larger than the rear frame 12, as discussed with respect to FIGS. 2C and 2D, the alternative construction of utilizing a larger rear frame can be accomplished within the scope of this invention. In accordance with the embodiment of FIGS. 2A and 2B, identical elements are used as in the case of the FIGS. 2C and 2D embodiment with the exception that the down tube 18 joins the outer ring 20 of the front frame a few inches above the pedal housing 32. The top tube 16 is then dropped a few inches to place it well below the joint of the seat stays 22 and the seat post 30 yet, remains above the brake pivot stay when the bicycle is folded.

It is noted that additional modifications of this invention can be accomplished without departing from the essential scope thereof.

I claim:

1. A foldable bicycle frame comprising;
   a complete closed front frame having a first hollow member to accommodate a seat post,
   a complete rear frame having a second hollow member to accommodate said seat post, said first and second hollow members being concentric to define a joining section, whereby said front and rear frames are foldable about said hollow members, and
   means to secure said first and second hollow members into a rigid orientation.

2. A foldable bicycle frame comprising;
   a complete closed front frame, a complete rear frame, means defining a joining section for said front and rear frames comprising, members of said complete closed front frame and said rigid rear frame defining a pair of concentric mutually rotatable members, a first of said members comprising a seat tube of said front frame and a second of said members comprising a seat tube of said rear frame, and means to secure said rotatable members from rotation.

3. A foldable bicycle frame comprising;
   a complete closed front frame and a separate complete rear frame, both said complete closed front and complete rear frames being rigid continuous frames,
   a joining section defined by seat tubes of said front and rear frames wherein said seat tubes form a pair of concentric mutually rotatable members, and
   means to secure said rotatable members from rotation, and when released allow said front and rear frames to fold about said concentric members.

4. A foldable bicycle comprising;
   a complete closed front frame, a separate complete rear frame, said front and rear frames being continuous and rigid, a seat post, means for holding said seat post formed by first and second tubular members of said front and rear frames defining concentric members at a joining section wherein said front and rear frames are foldable about said concentric joining section and,
   means to secure said first and second tubular members in a fixed orientation.

5. The apparatus of claims 1, 2, 3 or 4 wherein said first member is associated with said front frame and is concentric inside said second member associated with said rear frame.

6. The apparatus of claims 1, 2, 3 or 4 wherein said first member is associated with said front frame and is concentric outside said second member associated with said rear frame.

7. The apparatus of claims 1, 2, 3 or 4 wherein said means to secure comprises at least one locking member to secure said front and rear frame members in an open position, said locking member being located on said joining section.

8. The apparatus of claim 7 further comprising an alignment member associated with said concentric members to align said front and rear frames in an open position.

9. The apparatus of claims 1, 2, 3 or 4 wherein said rear frame comprises a pair of seat stays and a pair of chain stays joined at drop outs for a rear wheel that is mounted therebetween and, said second member joining said seat and chain stays to form a rigid rear frame and, a pedal housing positioned between said second member and said chain stays and secured thereto.

10. The apparatus of claims 1, 2, 3 or 4 further comprising a pedal housing cut away and mounted onto a seat tube to permit a pedal crank shaft to bypass said seat tube.

11. The apparatus of claims 1, 2 or 3 further comprising a pedal housing mounted on the end of the concentric member forming a portion of said rear frame.

12. The apparatus of claims 1, 2, 3 or 4 wherein said means to secure said front and rear frames comprises a binder bolt wedging said first and second members together, said binder bolt defining a monolithic frame.

13. The apparatus of claims 1, 2, 3 or 4 wherein said front and rear frame comprise a backpack frame.

14. The apparatus of claim 13 further comprising a plurality of mounting points attached to said front frame to attach backpack panniers and support webbing.

15. The apparatus of claim 14 further comprising a pair of shoulder straps extending across said front frame from a frame member defining a seat tube to a handle bar stem.

16. The apparatus of claim 14 further comprising a hip belt attached to said front frame.

17. The apparatus of claim 13 further comprising a backband attached to said front frame.

18. The apparatus of claims 1, 2, 3 or 4 further comprising a front wheel detachably mounted to said front frame, a rear wheel mounted on said rear frame, means to attach said front wheel to said rear frame where said bicycle is folded, a gear mechanism having operative levers attached to said front frame and, a steering yoke rotatably mounted on said front frame.

* * * * *